United States Patent
Nanami

(10) Patent No.: US 8,199,046 B2
(45) Date of Patent: Jun. 12, 2012

(54) RADAR SYSTEM TO DETERMINE WHETHER AN OBJECT IS SUBJECT OF DETECTION BASED ON INTENSITY OF A RADIO WAVE EMISSION OF THE OBJECT

(75) Inventor: Takeshi Nanami, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 392 days.

(21) Appl. No.: 12/308,383

(22) PCT Filed: Jun. 29, 2007

(86) PCT No.: PCT/IB2007/001805
§ 371 (c)(1),
(2), (4) Date: Dec. 12, 2008

(87) PCT Pub. No.: WO2008/004077
PCT Pub. Date: Jan. 10, 2008

(65) Prior Publication Data
US 2009/0251355 A1    Oct. 8, 2009

(30) Foreign Application Priority Data
Jun. 30, 2006   (JP) .................................. 2006-182445

(51) Int. Cl.
*G01S 13/04*   (2006.01)
*G01S 13/86*   (2006.01)
*G01S 13/00*   (2006.01)
*G01S 13/93*   (2006.01)

(52) U.S. Cl. ............... 342/52; 342/27; 342/70; 342/89; 342/91; 342/175; 342/176; 342/179; 342/195; 701/300; 701/301; 340/425.5; 340/435; 340/436; 340/933; 340/937

(58) Field of Classification Search .............. 342/27, 342/28, 52–55, 70–72, 82–103, 175, 176, 342/179, 192–197; 701/1, 70, 93, 96, 300, 701/301; 340/425.5, 435, 436, 933–943
See application file for complete search history.

(56) References Cited

U.S. PATENT DOCUMENTS
3,449,710 A * 6/1969 Moss, Jr. ..................... 342/91
(Continued)

FOREIGN PATENT DOCUMENTS
EP    1 347 306 A2    9/2003
(Continued)

Primary Examiner — Bernarr Gregory
(74) Attorney, Agent, or Firm — Oliff & Berridge, PLC

(57) ABSTRACT

An object detection system includes a first object detection unit that detects an object in an area near the system using a radar and an object determination section that determines whether the object in the area near the system is a subject of detection, using a result of detection by the first object detection unit. The object determination section treats the object as the subject of detection if (i) an intensity of a radio wave from the object that is currently received by the first object detection unit is equal to or higher than a first threshold value or if (ii) an intensity of a radio wave from the object that was received in the past by the first object detection unit was equal to or higher than the first threshold value and the intensity of the radio wave from the object that is currently received by the first object detection unit is equal to or higher than a second threshold value that is lower than the first threshold value.

7 Claims, 2 Drawing Sheets

U.S. PATENT DOCUMENTS

| | | | |
|---|---|---|---|
| 3,465,336 A * | 9/1969 | Rittenbach et al. | 342/91 |
| 5,428,359 A * | 6/1995 | Yoneyama et al. | 342/70 |
| 5,574,463 A * | 11/1996 | Shirai et al. | 342/70 |
| 5,633,642 A * | 5/1997 | Hoss et al. | 342/70 |
| 5,959,571 A * | 9/1999 | Aoyagi et al. | 342/70 |
| 6,002,983 A * | 12/1999 | Alland et al. | 701/301 |
| 6,124,823 A * | 9/2000 | Tokoro | 342/70 |
| 6,163,252 A * | 12/2000 | Nishiwaki | 340/435 |
| 6,275,180 B1 * | 8/2001 | Dean et al. | 342/70 |
| 6,300,865 B1 * | 10/2001 | Fechner et al. | 340/436 |
| 6,377,205 B1 * | 4/2002 | Eckersten et al. | 342/90 |
| 6,515,615 B2 * | 2/2003 | Burchett et al. | 342/91 |
| 6,583,403 B1 * | 6/2003 | Koike et al. | 342/70 |
| 6,680,689 B1 * | 1/2004 | Zoratti | 342/70 |
| 6,812,882 B2 * | 11/2004 | Ono | 342/70 |
| 6,838,981 B2 * | 1/2005 | Zoratti | 342/70 |
| 7,035,735 B2 * | 4/2006 | Knoop et al. | 701/301 |
| 7,053,817 B2 * | 5/2006 | Nakano et al. | 342/90 |
| 7,295,154 B2 * | 11/2007 | Walton et al. | 342/194 |
| 7,339,517 B2 * | 3/2008 | Nakanishi | 342/70 |
| 7,570,198 B2 * | 8/2009 | Tokoro | 342/70 |
| 2004/0246167 A1 | 12/2004 | Kumon et al. | |
| 2005/0270225 A1 * | 12/2005 | Tokoro | 342/70 |

FOREIGN PATENT DOCUMENTS

| | | |
|---|---|---|
| EP | 1 602 940 A1 | 12/2005 |
| EP | 1 674 883 A2 | 6/2006 |
| GB | 2 283 631 A | 5/1995 |
| JP | A-2004-17763 | 1/2004 |
| JP | A-2004-191131 | 7/2004 |
| JP | A-2005-297648 | 10/2005 |
| JP | A-2006-10410 | 1/2006 |
| JP | A-2007-232412 | 9/2007 |
| WO | WO 2005/091015 A1 | 9/2005 |

* cited by examiner

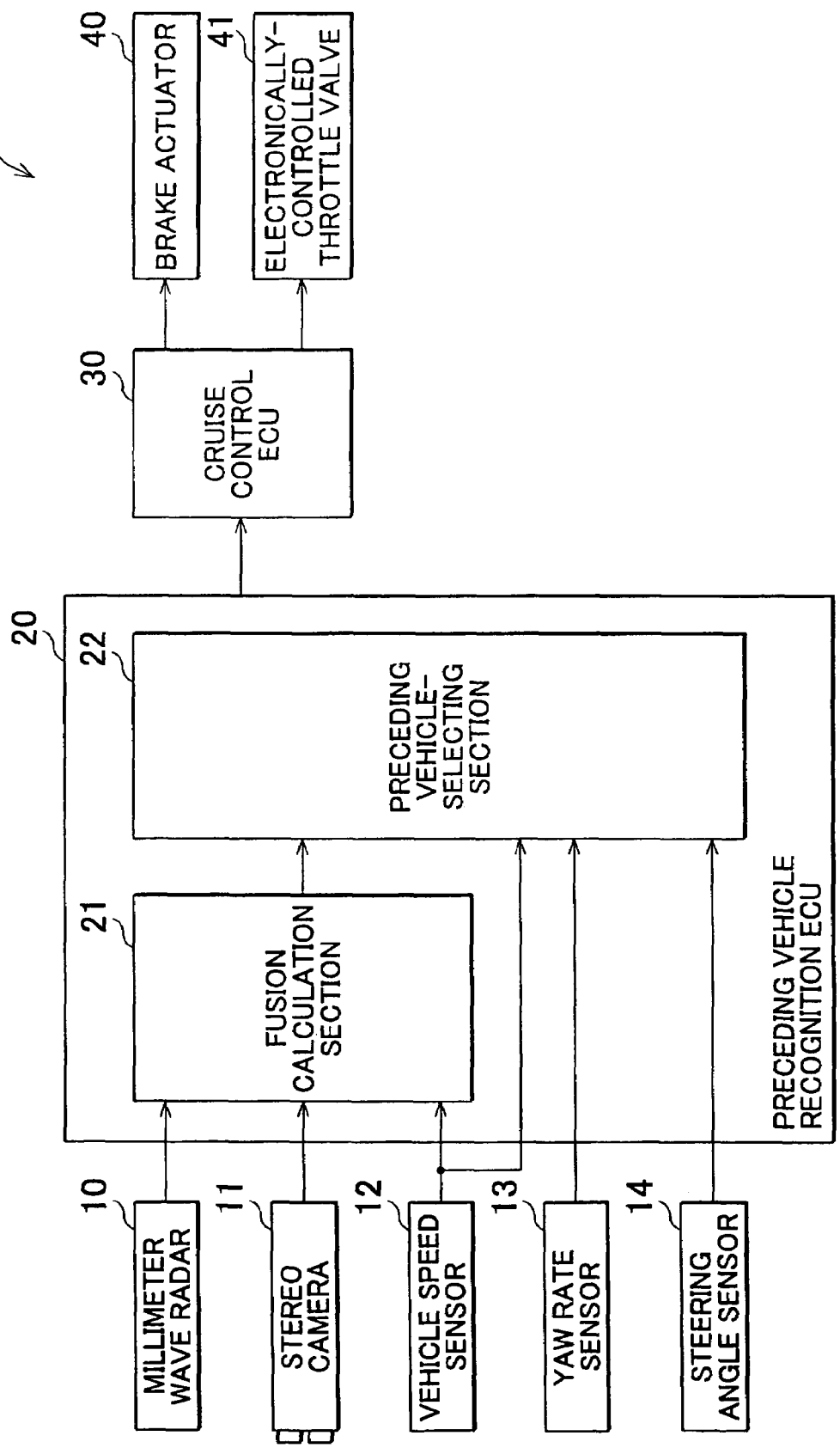

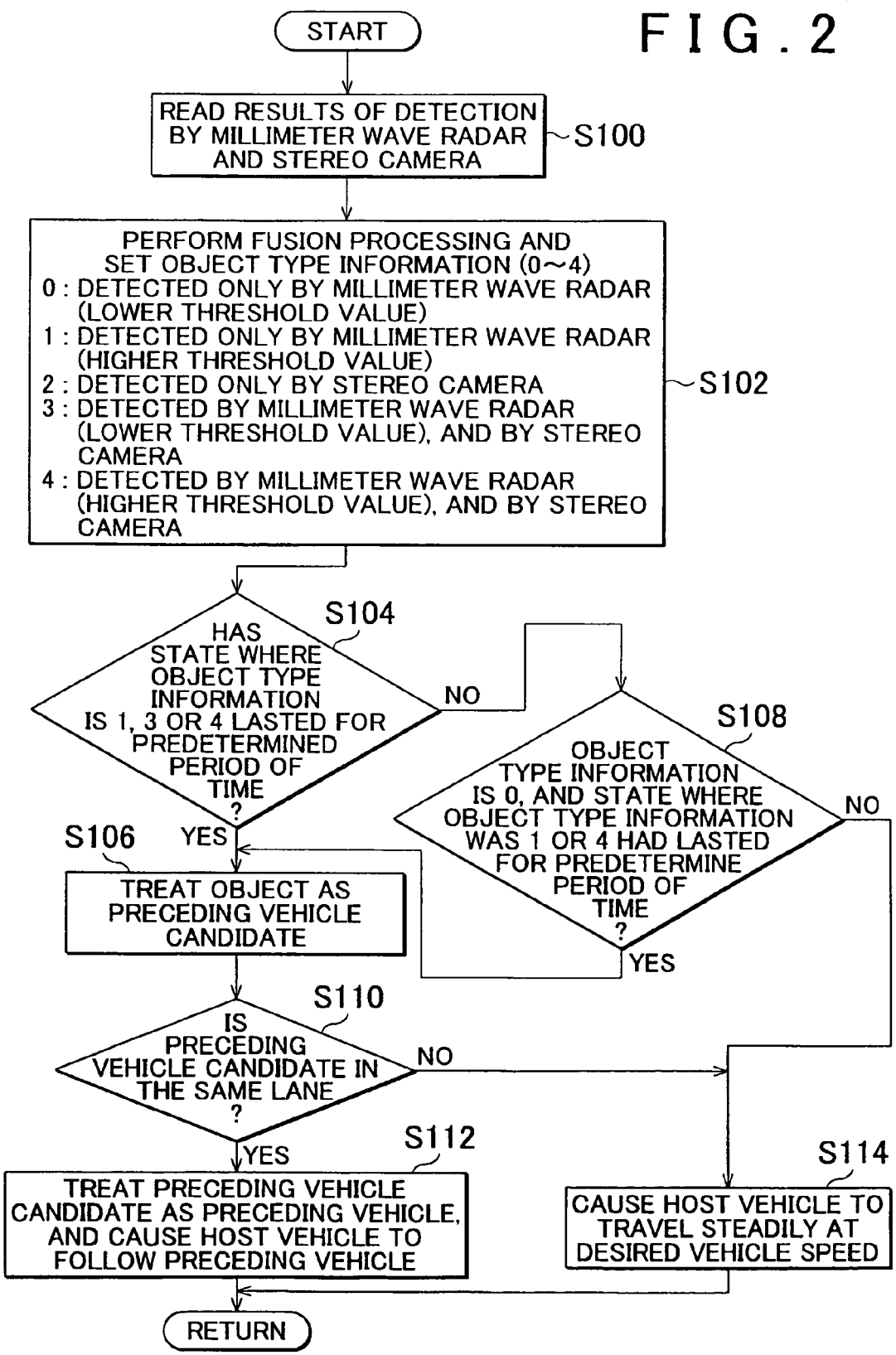

RADAR SYSTEM TO DETERMINE WHETHER AN OBJECT IS SUBJECT OF DETECTION BASED ON INTENSITY OF A RADIO WAVE EMISSION OF THE OBJECT

BACKGROUND OF THE INVENTION

1. Field of the Invention

The present invention relates to an object detection system, and more specifically, relates to an object detection system, a drive assist system provided with the object detection system, and an object detection method that detect vehicles, obstacles and the like on a road.

2. Description of the Related Art

Drive assist systems that detect a distance and a relative speed between a host vehicle and a preceding vehicle, and control throttles and brakes to automatically keep the speed and the following distance of the host vehicle at set values, have been put to practical use. In the field of such drive assist systems, as technologies for detecting objects such as vehicles in the path of the host vehicle, radar systems using millimeter radio waves or the like are available. In Japanese Patent Application Publication No. 2004-191131 (JP-A-2004-191131), a technology is described in which a higher threshold value for identifying vehicles and a lower threshold value for identifying pedestrians are set, and an object is identified as a vehicle when the intensity of a received radio wave is equal to or higher than the higher threshold value, and an object is identified as a pedestrian when the intensity of a received radio wave is equal to or higher than the lower threshold value.

However, with regard to the above technology, the higher threshold value is set in order to identify vehicles, which can cause a problem that objects, such as motorbikes and bicycles, from which a radio wave of low intensity is received, can be easily and frequently lost even after the object is detected. When a drive assist system that causes the host vehicle to follow a preceding vehicle frequently loses an object, the drive assist system repeatedly determines that a preceding vehicle is present, and that no preceding vehicle is present, within a short time, so that the drive assist system causes the host vehicle to perform unnecessary acceleration and deceleration. On the other hand, when a lower threshold value is set for use in identifying vehicles, control is performed with respect to the ghost caused by road surface reflection, etc, and, as a result, erroneous control and erroneous warning can easily occur.

SUMMARY OF THE INVENTION

The present invention provides an object detection system, a drive assist system provided with the object detection system, and an object detection method that are less prone to make erroneous detection, and are less prone to lose an object once detected even in the case of detecting an object from which a radio wave of low intensity is received.

An object detection system according to a first aspect of the present invention includes: a first object detection unit for detecting an object in an area near the system using a radar; and an object determination section for determining whether the object in the area near the system is a subject of detection, using a result of detection by the first object detection unit. With regard to the object whose existing probability is low, the object determination section treats the object, from which a radio wave whose intensity is equal to or higher than a first threshold value is being currently received by the first object detection unit, as the subject of detection. With regard to the object whose existing probability is high, the object determination section treats the object, from which a radio wave whose intensity is equal to or higher than a second threshold value, which is lower than the first threshold value, is being currently received by the first object detection unit, as the subject of detection.

According to the first aspect, an object detection system is realized that is less prone to make erroneous detection, and is less prone to lose an object once detected even in the case of detecting an object from which a radio wave of low intensity is received. With regard to the object whose existing probability is low, the object determination section detects the object, from which a radio wave whose intensity is equal to or higher than a first threshold value, which is the higher threshold value, is being currently received by the first object detection unit, so that it is possible to prevent erroneous detection. With regard to the object whose existing probability is high, the object determination section detects the object, from which a radio wave whose intensity is equal to or higher than a second threshold value, which is the lower threshold value, is being currently received by the first object detection unit, so that an object detection system is realized that detects, with high probability, an object from which a radio wave of low intensity is received, and is less prone to lose an object once detected.

In the first aspect, the object whose existing probability is high may be the object from which a radio wave whose intensity was equal to or higher than the first threshold value was received in the past by the first object detection unit.

According to the above aspect, the object from which a radio wave whose intensity was equal to or higher than the first threshold value, which is the higher threshold value, was received in the past by the first object detection unit is treated as the object whose existing probability is high, so that erroneous detection is less prone to occur. In addition, the object whose existing probability is high is detected when the intensity of the radio wave received by the first object detection unit is equal to or higher than the second threshold value, which is the lower threshold value, even when the intensity of the radio wave being currently received by the first object detection unit is lower than the first threshold value. Thus, the object detection system is less prone to lose an object.

In the above aspect, the object detection system may further include a second object detection unit for detecting an object in an area near the system. In addition, the object determination section may determine whether the object in the area near the system is the subject of detection, using a result of detection by the second object detection unit in addition to the result of detection by the first object detection unit. The object whose existing probability is high may be the object that is being currently detected by the second object detection unit.

With this configuration, the object that is being currently detected by the second object detection unit is treated as the object whose existing probability is high, so that erroneous detection is less prone to occur. In addition, the object whose existing probability is high is detected when the intensity of the radio wave received by the first object detection unit is higher than the second threshold, even when the intensity of the radio wave received by the first object detection unit is lower than the first threshold value. Thus, the object detection system is less prone to lose the object.

In the above aspect, the second object detection unit may detect an object by using image recognition.

An object detection system according to a second aspect of the present invention includes: a first object detection unit for detecting an object in an area near the system using a radar; a second object detection unit that takes an image of the area near the system, and detects an object in the area near the system based on the image; and an object determination section for determining whether the object in the area near the system detected by at least one of the first and second object detection units is a subject of detection, using a result of detection by the first object detection unit, and a result of detection by the second object detection unit. With regard to the object whose existing probability is low, the object determination section treats the object, from which a radio wave whose intensity is equal to or higher than a first threshold value is being currently received by the first object detection unit, as the subject of detection. With regard to the object whose existing probability is high, the object determination section treats the object, from which a radio wave whose intensity is equal to or higher than a second threshold value that is lower than the first threshold value is being currently received by the first object detection unit, as the subject of detection.

According to the second aspect, an object detection system is realized that is less prone to make erroneous detection, and is less prone to lose an object once detected even in the case of detecting an object from which a radio wave of low intensity is received. With regard to the object whose existing probability is low, the object determination section detects the object, from which a radio wave whose intensity is equal to or higher than a first threshold value is being currently received by the first object detection unit, so that it is possible to prevent erroneous detection. With regard to the object whose existing probability is high, the object determination section detects the object, from which a radio wave whose intensity is equal to or higher than a second threshold value, which is the lower threshold value, is being currently received by the first object detection unit, so that an object detection system is realized that detects, with high probability, an object from which a radio wave of low intensity is received, and is less prone to lose an object once detected.

With regard to the second aspect, the object whose existing probability is high may be the object from which a radio wave whose intensity was equal to or higher than the first threshold value was received in the past by the first object detection unit.

According to the aspect, the object from which a radio wave whose intensity was equal to or higher than the first threshold value, which is the higher threshold value, was received in the past by the first object detection unit is treated as the object whose existing probability is high, so that erroneous detection is less prone to occur. In addition, the object whose existing probability is high is detected when the intensity of the radio wave received by the first object detection unit is higher than the second threshold, even when the intensity of the radio wave received by the first object detection unit is lower than the first threshold value. Thus, the object detection system is less prone to lose an object.

With regard to the above aspect, the object whose existing probability is high may be the object that is being currently detected by the second object detection unit.

According to the aspect, the object that is being currently detected by the second object detection unit is treated as the object whose existing probability is high, so that erroneous detection is less prone to occur. In addition, the object whose existing probability is high is detected when the intensity of the radio wave received by the first object detection unit is higher than the second threshold, which is the lower threshold value, even when the intensity of the radio wave currently being received by the first object detection unit is lower than the first threshold value. Thus, the object detection system is less prone to lose an object.

A drive assist system for a vehicle provided with the object detection system according to the above aspect may further include: a fusion detection section for detecting parameters indicating a distance, a relative speed, and a lateral offset between a host vehicle and the subject of detection; a sensor for detecting a drive status of the host vehicle; a preceding vehicle-selecting section that compares a result of detection by the sensor with a position of the subject of detection based on the detected parameters to determine whether the object is in a path of the host vehicle, and selects a preceding vehicle based on the determination result; and a drive control section that controls running speed of the host vehicle based on the parameters detected by the fusion detection section, and based on the determination and selection result of the preceding vehicle-selecting section.

An object detection method according to a third aspect of the present invention detects an object using a radar, and determines whether the object is a subject of detection. The subject of detection includes: (i) the object from which a radio wave whose intensity is equal to or higher than a first threshold value is being currently received by the radar; and (ii) the object from which a radio wave whose intensity was equal to or higher than the first threshold value was received in the past, and from which a radio wave whose intensity is equal to or higher than a second threshold value that is lower than the first threshold value is being currently received.

An object detection method according to a fourth aspect of the present invention detects an object using a radar, takes an image to detect an object based on the image, and determines whether the object detected in at least one of the preceding steps is a subject of detection. The subject of detection includes: (i) the object from which a radio wave whose intensity is equal to or higher than a first threshold value is being currently received by the radar; (ii) the object that is detected using the image, and from which a radio wave whose intensity is equal to or higher than a second threshold value that is lower than the first threshold value is being currently received; and (iii) the object from which a radio wave whose intensity was equal to or higher than the first threshold value was received in the past, and from which a radio wave whose intensity is equal to or higher than the second threshold value that is lower than the first threshold vale is being currently received.

The object detection system of the present invention is less prone to make erroneous detection, and is less prone to lose an object once detected even in the case of detecting an object from which a radio wave of low intensity is received.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 1 is a block diagram showing a configuration of an ACC system according to an embodiment of the present invention; and FIG. 2 is a flow chart showing a processing procedure of drive assist control performed by the ACC system according to the embodiment of the present invention.

DETAILED DESCRIPTION OF THE PREFERRED EMBODIMENTS

An object detection system according to an embodiment of the present invention will be described below with reference to FIGS. 1 and 2.

FIG. 1 is a diagram showing a configuration of a cruise control system (hereinafter referred to as the ACC (adaptive cruise control) system) 1, which is an example in which the object detection system according to the embodiment is applied to a drive assist system.

The ACC system 1 mainly includes: a millimeter wave radar 10 that detects an object, such as a preceding vehicle, by scanning an area ahead of a vehicle using a millimeter radio wave; a stereo camera 11 that acquires an image of the frontward area detects the preceding vehicle or the like using image recognition; a preceding vehicle recognition ECU 20 that recognizes the preceding vehicle based on the result of detection by the millimeter wave radar 10 and the stereo camera 11; and a cruise control ECU 30 that performs running speed control by controlling brake actuators 40, and electronically-controlled throttle valves 41. When no preceding vehicle is recognized, the ACC system 1 performs speed-maintaining control for maintaining the vehicle speed that is set by a driver. When the preceding vehicle is recognized, the ACC system 1 performs slow-acceleration/slow-deceleration control or follow-up control for maintaining the distance between the host vehicle and the preceding vehicle at a set following distance.

The millimeter wave radar 10 radiates millimeter waves forward of the vehicle, while horizontally scanning an area ahead of the vehicle, and receives the radio wave that was reflected from the surface of an object, such as a preceding vehicle, and calculates parameters, such as the existence of a preceding vehicle candidate, a distance and relative speed between the preceding vehicle candidate and the host vehicle, and a lateral offset (lateral position) of the preceding vehicle with respect to the host vehicle, based on the intensity of the radio wave and the variation in frequency of the received signal. The millimeter wave radar 10 then outputs the parameters as the detection results to the preceding vehicle recognition ECU 20. The millimeter wave radar 10 detects an object, such as an automobile, from which reflection of radar waves is strong, when the intensity of the received radio wave is equal to or higher than a higher threshold value (first threshold value). The millimeter wave radar 10 detects an object, such as a small motorbike and a bicycle, from which reflection of the radar wave is weak, when the intensity of the received radio wave is equal to or higher than a lower threshold value (second threshold value). The millimeter wave radar 10 functions as a first object detection unit of the present invention.

The stereo camera 11 includes a pair of CCD cameras for capturing images of an area ahead of the vehicle, and an image processing section for detecting an object, such as the preceding vehicle, using image recognition based on the captured images. The image processing section extracts a preceding vehicle candidate from the images taken by the CCD cameras, by performing edge extraction processing, pattern recognition processing, or the like. In addition, the distance between the host vehicle and the preceding vehicle, and the lateral offset of the preceding vehicle with respect to the host vehicle are calculated by using triangulation techniques based on the difference between the positions of the object (preceding vehicle) in the right and left captured images. The relative speed between the preceding vehicle and the host vehicle is calculated based on the amount of variation in the distance therebetween relative to the distance obtained by the calculation for the preceding frame. The results of detection are output to the preceding vehicle recognition ECU 20. In this way, in the ACC system 1, the millimeter wave radar 10 and the stereo camera 11, which use respective different detection principles, detect the same parameters (distance, relative speed, and lateral offset). The stereo camera 11 functions as a second object detection unit of the present invention.

The vehicle is provided with a vehicle speed sensor 12 for detecting a vehicle speed, a yaw rate sensor 13 for detecting a yaw rate of the vehicle, and a steering angle sensor 14 for detecting a steering angle of a steering wheel. These sensors are connected to the preceding vehicle recognition ECU 20, and the signals detected by these sensors are supplied to the preceding vehicle recognition ECU 20.

The preceding vehicle recognition ECU 20 includes: a microprocessor that performs calculation; a ROM that stores programs, etc. for causing the microprocessor to perform various processes; a RAM that stores various data, such as calculation results; and a back-up RAM whose memory contents are retained by a 12V battery. In addition, the preceding vehicle recognition ECU 20 has a fusion calculation section 21 and a preceding vehicle-selecting section 22.

The results of detection by the millimeter wave radar 10 and the stereo camera 11, that is, parameters, such as the existence of a preceding vehicle candidate, a distance and a relative speed between the host vehicle and the preceding vehicle candidate, and a lateral offset of the preceding vehicle with respect to the host vehicle are supplied to the fusion calculation section 21. The fusion calculation section 21 then performs fusion of the results of detection by the millimeter wave radar 10 and the stereo camera 11, and determines the existence of a preceding vehicle candidate, object parameters concerning the preceding vehicle candidate (the distance and relative speed between the host vehicle and the preceding vehicle candidate, and the lateral offset of the preceding vehicle with respect to the host vehicle), and object type information indicating the detection status. That is, the fusion calculation section 21 functions as an object determination section and a fusion detection section of the present invention.

Specifically, when the preceding vehicle candidate is detected by both the millimeter wave radar 10 and the stereo camera 11, fusion of the distance and the relative speed between the host vehicle and the preceding vehicle, which have been detected by the millimeter wave radar 10, and the lateral offset of the host vehicle with respect to the host vehicle, which has been detected by the stereo camera 11, is performed, and these parameters are used as the object parameters of the preceding vehicle. Although the millimeter wave radar 10 detects the distance and the relative speed between the object and the host vehicle with high accuracy, the millimeter wave radar 10 is inferior to the stereo camera 11 in accuracy in detecting the lateral offset and the object width. On the other hand, although the stereo camera 11 detects the lateral offset and the object width with high accuracy, the stereo camera 11 is inferior to the millimeter wave radar 10 in accuracy in detecting the distance and the relative speed between the object and the host vehicle. For these reasons, by performing fusion of the highly accurately detected parameters based on the results of detection by the millimeter wave radar 10 and the stereo camera 11, it is possible to obtain highly accurate object parameters.

When an object is detected only by the millimeter wave radar 10 with a radio wave intensity equal to or higher than the lower threshold value and lower than the higher threshold value, the fusion calculation section 21 sets the object type information to "0". When an object is detected only by the millimeter wave radar 10 with a radio wave intensity higher than the higher threshold value, the fusion calculation section 21 sets the object type information to "1". When an object is detected only by the stereo camera 11, the fusion calculation section 21 sets the object type information to "2". When an object is detected by the millimeter wave radar 10 with a radio wave intensity equal to or higher than the lower threshold value and lower than the higher threshold value, and is detected also by the stereo camera 11, the fusion calculation section 21 sets the object type information to "3". When an object is detected by the millimeter wave radar 10 with a radio wave intensity higher than the higher threshold value, and is detected also by the stereo camera 11, the fusion calculation section 21 sets the object type information to "4". The fusion calculation section 21 accumulates object parameters and a history of the object type information, and determines a preceding vehicle candidate based on the accumulated data. The object parameters, the object type information, and the data on the preceding vehicle candidate calculated by the fusion calculation section 21 are output to the preceding vehicle-selecting section 22.

The preceding vehicle-selecting section 22 estimates the path of the host vehicle from the drive status of the host vehicle determined based on the vehicle speed signal from the vehicle speed sensor 12, the yaw rate signal from the yaw rate sensor 13, and the steering angle signal from the steering angle sensor 14, and compares the estimation result and the position of the preceding vehicle candidate. When it is determined that the preceding vehicle candidate is in the forward path of the host vehicle, the preceding vehicle candidate is recognized as the preceding vehicle. When the path of the host vehicle is estimated, information on the white line that is detected by the stereo camera 11 may be used.

The preceding vehicle recognition ECU 20 is connected to the cruise control ECU 30 via a communication line. The object parameters and the object type information of the preceding vehicle that has been recognized by the preceding vehicle recognition ECU 20 are output to the cruise control ECU 30 via the communication line.

The cruise control ECU 30 also includes: a microprocessor that performs calculation; a ROM that stores programs, etc. for causing the microprocessor to perform various processes; a RAM that stores various data, such as calculation results; and a back-up RAM whose memory contents are retained by a 12V battery. The preceding vehicle recognition ECU 20 and the cruise control ECU 30 may have a configuration in which these ECUs are integrated in terms of hardware, or in which these ECUs have a shared portion. Connected to the cruise control ECU 30 are the brake actuators 40 that control the hydraulic pressure supplied to wheel cylinders that operate brakes attached to respective wheels, and the electronically-controlled throttle valves 41 that control the amount of air supplied to the engine.

The cruise control ECU 30 adjusts the driving power and the braking power applied to the vehicle by controlling the brake actuators 40 and the electronically-controlled throttle valves 41 based on the existence of the preceding vehicle, the object parameters concerning the preceding vehicle, and the object type information that are supplied from the preceding vehicle recognition ECU 20, thereby performing the speed-maintaining control, the follow-up control, and the slow-acceleration/slow-deceleration control. That is, the cruise control ECU 30 functions as a drive control section of the present invention.

Next, operation of the ACC system 1 will be described with reference to FIG. 2. FIG. 2 is a flow chart showing a processing procedure of the drive assist control performed by the ACC system 1. This control is repeatedly performed by the preceding vehicle recognition ECU 20 and the cruise control ECU 30 according to predetermined timing during the period from when the electric power of the vehicle is turned on to when it is turned off.

In step S100, the parameters, such as the intensity of a received radio wave, the existence of an object, the distance and the relative speed between the object and the host vehicle, and the lateral offset of the preceding vehicle with respect to the host vehicle, which are detected by the millimeter wave radar 10, are read. Similarly, the parameters, such as the existence of an object, the distance and relative speed between the object and the host vehicle, and the lateral offset of the preceding vehicle with respect to the host vehicle, which are detected by the stereo camera 11, are read.

In the subsequent step S102, the fusion calculation section 21 performs fusion of the parameters detected by the millimeter wave radar 10 and the stereo camera 11 that are read in step S100, and determines the existence of an object, object parameters (distance, relative speed, and lateral offset), and object type information indicating the detection status.

More specifically, as described above, the fusion calculation section 21 sets the object type information to one of "0" to "4", depending on the intensity of the received radio wave detected by the millimeter wave radar 10, and on whether the object is detected by the stereo camera 11.

In step S104, a history of the object type information that is set in step S102 is referred to, and, when a state where the object type information is any one of 1, 3, and 4 has lasted for a predetermined period of time (YES in step S104), the object is treated as the preceding vehicle candidate (S106). Specifically, when an object is detected by the millimeter wave radar 10 with an intensity equal to or higher than the higher threshold value, the object is treated as the preceding vehicle candidate irrespective of the result of detection by the stereo camera 11 (the object type information is "1" or "4"). When an object is detected by the millimeter wave radar 10 with an intensity equal to or higher than the lower threshold value, and is detected also by the stereo camera 11, the object is treated as the preceding vehicle candidate (the object type information is "3").

When it is determined that a state where the object type information is any one of "1", "3", and "4" has not lasted for the predetermined period of time (NO in step S104), the process proceeds to step S108. In step S108, the object whose object type information is zero, and that had been detected by the millimeter wave radar 10 for a predetermined period of time with a radio wave intensity equal to or higher than the higher threshold value (YES in step S108), the object is treated as the preceding vehicle candidate (S106). In the above example, whether a state where the object type information is any one of "1", "3", and "4" has lasted for the predetermined period of time is the criterion for determining whether the object should be treated as the preceding vehicle candidate, the present invention is not limited to this. For example, a configuration in which, when a state where the object type information is any one of "1", "3", and "4" is intermittently realized a predetermined number of times, the object is treated as a preceding vehicle candidate, or a configuration in which, when the object type information is any one of "1", "3", and "4", the object is immediately treated as the preceding vehicle candidate.

In step S110, the preceding vehicle-selecting section 22 determines whether the preceding vehicle candidate of step S106 is in the same lane. When it is determined that the preceding vehicle candidate is in the same lane in step S110 (YES in step S110), the process proceeds to step S112. In step S112, the preceding vehicle-selecting section 22 selects the preceding vehicle candidate in the same lane as a preceding vehicle, and the cruise control ECU 30 controls the brake actuators 40 and the-electronically-controlled throttle valves 41 based on the distance and the relative speed between the host vehicle and the preceding vehicle, and causes the host vehicle to follow the preceding vehicle.

When the determination result is NO in step S108, and as a result, the object is not treated as the preceding vehicle candidate, or when it is determined in step S110 that the preceding vehicle candidate is not in the same lane (NO), the cruise control ECU 30 controls the brake actuator 40 and the electronically-controlled throttle valves 41 to cause the host vehicle to travel steadily at a desired vehicle speed.

According to the embodiment, fusion of parameters such as a following distance and a relative speed between the host vehicle and the preceding vehicle candidate, and a lateral offset obtained by using the millimeter wave radar 10 and the stereo camera 11, which use respective different detection principles, is performed, so that the object parameters concerning the preceding vehicle candidate are determined. When the preceding vehicle candidate is detected by both of the detection devices, accuracy in detecting the preceding vehicle candidate is enhanced, and, as a result, control performance of the ACC control is enhanced. With regard to the object that is being currently detected by the stereo camera 11, or the object that had been detected by the millimeter wave radar 10 with a radio wave intensity equal to or higher than the higher threshold value for a predetermined period of time, that is, the object whose existing probability is high, the fusion calculation section 21 treats, as a preceding vehicle candidate, the object from which a radio wave whose intensity is equal to or higher than the lower threshold value is received by the millimeter wave radar 10. Thus, even in the case of detecting an object from which a radio wave of low intensity is received, the probability of erroneous detection is small, and it is possible to make it less prone to lose the object once detected.

In addition, according to the embodiment, with regard to the object that is not being currently detected by the stereo camera 11, that is, the object whose existing probability is low, the fusion calculation section 21 treats, as a preceding vehicle candidate, the object from which a radio wave whose intensity is equal to or higher than the higher threshold value is received by the millimeter wave radar 10. Thus, it is possible to prevent erroneous detection.

Moreover, according to the embodiment, with regard to the object from which a radio wave whose intensity is equal to or higher than the lower threshold value is received by the millimeter wave radar 10, the object that is detected also by the stereo camera 11 is treated as a preceding vehicle candidate. Thus, it is possible to prevent erroneous recognition, erroneous control, and erroneous warning with respect to the ghost caused by road surface reflection, etc, and to perform follow-up control even with respect to objects such as motorbikes and bicycles, from which reflection is weak. In addition, it is possible to prevent objects, such as motorbikes, from which reflection is weak, from being lost, and it is possible to reduce the number of times the vehicle is unnecessarily accelerated or decelerated.

Furthermore, according to the embodiment, the object from which radio waves whose intensity is equal to or higher than the higher threshold value had been received by the millimeter wave radar 10 for the predetermined period of time, is treated as a preceding vehicle candidate even when the detection result is showing that the intensity is equal to or higher than the lower threshold value and lower than the higher threshold value. Thus, it is possible to perform follow-up control without repeatedly losing an object even in the case of an object that is unstable in terms of detection, such as an automobile that has a round shape and has low reflectivity of radio waves. For this reason, it is possible to reduce the number of times the vehicle is unnecessarily accelerated or decelerated.

Although an embodiment of the present invention has been described, the present invention is not limited to the above embodiment, and various modifications and alterations can be made. In the embodiment, a drive assist system relating to an ACC system is named, the field to which the object detection system of the present invention is applied is not limited to this.

Although a stereo camera is used in the above embodiment, a single-lens camera may be used. A laser radar may be used instead of the millimeter wave radar.

The invention claimed is:

1. An object detection system comprising:
    a first object detection unit that detects an object in an area near the system using a radar;
    a second object detection unit that detects the object in the area near the system; and
    an object determination section that determines whether the object in the area near the system is a subject of detection, using a result of detection by the first object detection unit,
    wherein the object determination section treats the object as the subject of detection:
        if (i) an intensity of a radio wave from the object that is currently received by the first object detection unit is equal to or higher than a first threshold value; or
        if (ii) an intensity of a radio wave from the object that was received in the past by the first object detection unit was equal to or higher than the first threshold value and the intensity of the radio wave from the object that is currently received by the first object detection unit is equal to or higher than a second threshold value that is lower than the first threshold value,
    wherein the object determination section determines whether the object in the area near the system is the subject of detection, using a result of detection by the second object detection unit in addition to the result of detection by the first object detection unit, and
    wherein the object determination section treats the object as the subject of detection, if the object is being currently detected by the second object detection unit and the intensity of the radio wave from the object that is currently received by the first object detection unit is equal to or higher than the second threshold value.

2. The object detection system according to claim 1, wherein the second object detection unit detects the object by using image recognition.

3. An object detection system comprising:
    a first object detection unit that detects an object in an area near the system using a radar;
    a second object detection unit that takes an image of the area near the system, and detects an object in the area near the system based on the image; and
    an object determination section that determines whether the object in the area near the system detected by at least one of the first and second object detection units is a subject of detection, using a result of detection by the first object detection unit, and a result of detection by the second object detection unit,
    wherein the object determination section treats the object as the subject of detection:
        if (i) an intensity of a radio wave from the object that is currently received by the first object detection unit is equal to or higher than a first threshold value; or if (ii) an intensity of a radio wave from the object that was received in the past by the first object detection unit was equal to or higher than the first threshold value and the intensity of the radio wave from the object that is currently received by the first object detection unit is equal to or higher than a second threshold value that is lower than the first threshold value.

4. The object detection system according to claim 3, wherein the object determination section treats the object as the subject of detection, if the object is being currently detected by the second object detection unit and the intensity of the radio wave from the object that is currently received by the first object detection unit is equal to or higher than the second threshold value.

5. A drive assist system for a vehicle provided with the object detection system according to claim 3, further comprising:
   a fusion detection section that detects parameters indicating a distance, a relative speed, and a lateral offset between a host vehicle and the subject of detection;
   a sensor that detects a drive status of the host vehicle;
   a preceding vehicle-selecting section that compares a result of detection by the sensor with a position of the subject of detection based on the detected parameters to determine whether the object is in a path of the host vehicle, and selects a preceding vehicle based on the determination result; and
   a drive control section that controls running speed of the host vehicle based on the parameters detected by the fusion detection section, and based on the determination and selection result of the preceding vehicle-selecting section.

6. A drive assist system for a vehicle provided with an object detection system comprising:
   a first object detection unit that detects an object in an area near the system using a radar; and
   an object determination section that determines whether the object in the area near the system is a subject of detection, using a result of detection by the first object detection unit,
   wherein the object determination section treats the object as the subject of detection:
      if (i) an intensity of a radio wave from the object that is currently received by the first object detection unit is equal to or higher than a first threshold value; or
      if (ii) an intensity of a radio wave from the object that was received in the past by the first object detection unit was equal to or higher than the first threshold value and the intensity of the radio wave from the object that is currently received by the first object detection unit is equal to or higher than a second threshold value that is lower than the first threshold value,
   the drive assist system further comprises:
   a fusion detection section that detects parameters indicating a distance, a relative speed, and a lateral offset between a host vehicle and the subject of detection;
   a sensor that detects a drive status of the host vehicle;
   a preceding vehicle-selecting section that compares a result of detection by the sensor with a position of the subject of detection based on the detected parameters to determine whether the object is in a path of the host vehicle, and selects a preceding vehicle based on the determination result; and
   a drive control section that controls running speed of the host vehicle based on the parameters detected by the fusion detection section, and based on the determination and selection result of the preceding vehicle-selecting section.

7. An object detection method, comprising:
   detecting an object using a radar;
   taking an image, and detecting an object based on the image; and
   determining whether the object detected in at least one of the preceding steps is a subject of detection,
   wherein the subject of detection includes any one of: (i) the object from which a radio wave whose intensity is equal to or higher than a first threshold value is being currently received by the radar; (ii) the object that is detected using the image, and from which a radio wave whose intensity is equal to or higher than a second threshold value that is lower than the first threshold value is being currently received; and (iii) the object from which a radio wave whose intensity was equal to or higher than the first threshold value was received in the past, and from which a radio wave whose intensity is equal to or higher than the second threshold value that is lower than the first threshold value is being currently received.

* * * * *